United States Patent [19]

Callander

[11] Patent Number: 5,233,616
[45] Date of Patent: Aug. 3, 1993

[54] WRITE-BACK CACHE WITH ECC PROTECTION

[75] Inventor: Michael A. Callander, Hudson, Mass.

[73] Assignee: Digital Equipment Corporation, Maynard, Mass.

[21] Appl. No.: 591,199

[22] Filed: Oct. 1, 1990

[51] Int. Cl.⁵ .............................................. G06F 11/10
[52] U.S. Cl. ................................... 371/37.7; 371/40.2
[58] Field of Search ................... 371/37.7, 40.1, 40.2; 369/200 MS, 900 MS

[56] References Cited

U.S. PATENT DOCUMENTS

| | | | |
|---|---|---|---|
| 4,084,236 | 4/1978 | Chelberg | 395/575 X |
| 4,791,642 | 12/1988 | Taylor | 371/40.2 |
| 4,794,521 | 12/1988 | Ziegler | 395/425 |
| 4,862,462 | 8/1989 | Zulian | 371/37.7 |
| 4,920,539 | 4/1990 | Albonesi | 371/40.2 |
| 4,995,041 | 2/1991 | Hetherington | 371/40.1 |
| 5,058,116 | 10/1991 | Chao | 371/40.2 |

*Primary Examiner*—Robert W. Beausoliel
*Assistant Examiner*—Allen M. Lo
*Attorney, Agent, or Firm*—William P. Skladony; Ronald E. Myrick; Barry N. Young

[57] ABSTRACT

This invention relates to a write-back cache which is protected with parity and error correction coding ("ECC"). The parity and ECC codes are generated by a memory interface when data is transferred by main memory to the central processing unit ("CPU") associated with the cache. Thus, all data originating in main memory will be parity and ECC encoded when it passes through the memory interface, and the data, and its related parity information and ECC codes will be stored in the cache. On the other hand, data which is taken from the cache and modified by the CPU during its processing operations is also transferred to the memory interface for ECC encoding. Thus, all data modified by the CPU is also protected, and the modified data, and its related parity information and ECC codes are also stored in the cache. The memory interface also contains ECC checking and correcting circuitry which can correct erroneous data, on the basis of its ECC code, if that data has been corrupted while stored in the cache, or during transmission on a bus. Therefore, if data in the cache is corrupted, it can be corrected when it is returned to main memory via the memory interface. Accordingly, the invention makes a write-back cache compatible with full ECC protection, even though, at times, the cache may contain the only correct, current copy of given data in the system.

7 Claims, 2 Drawing Sheets

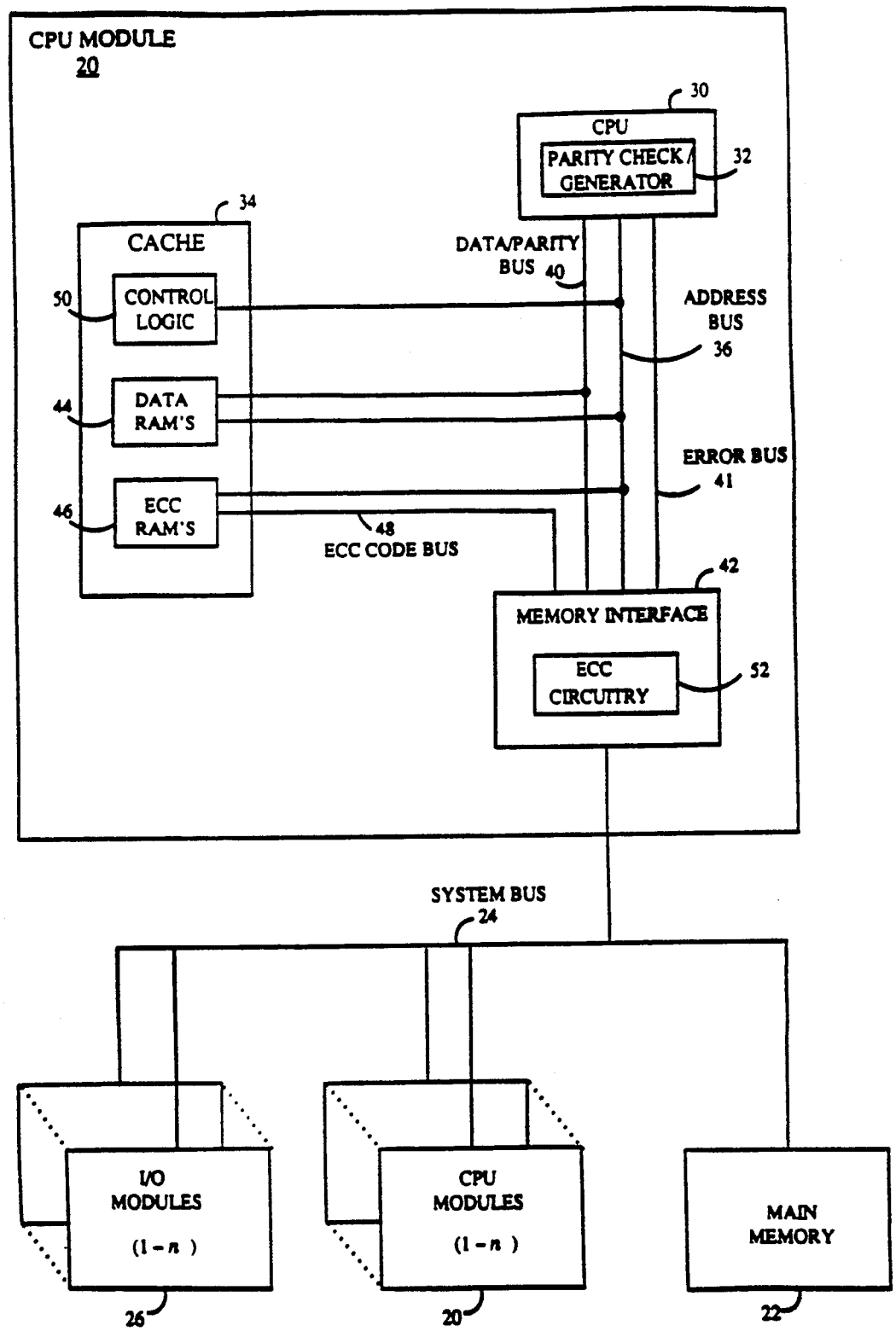

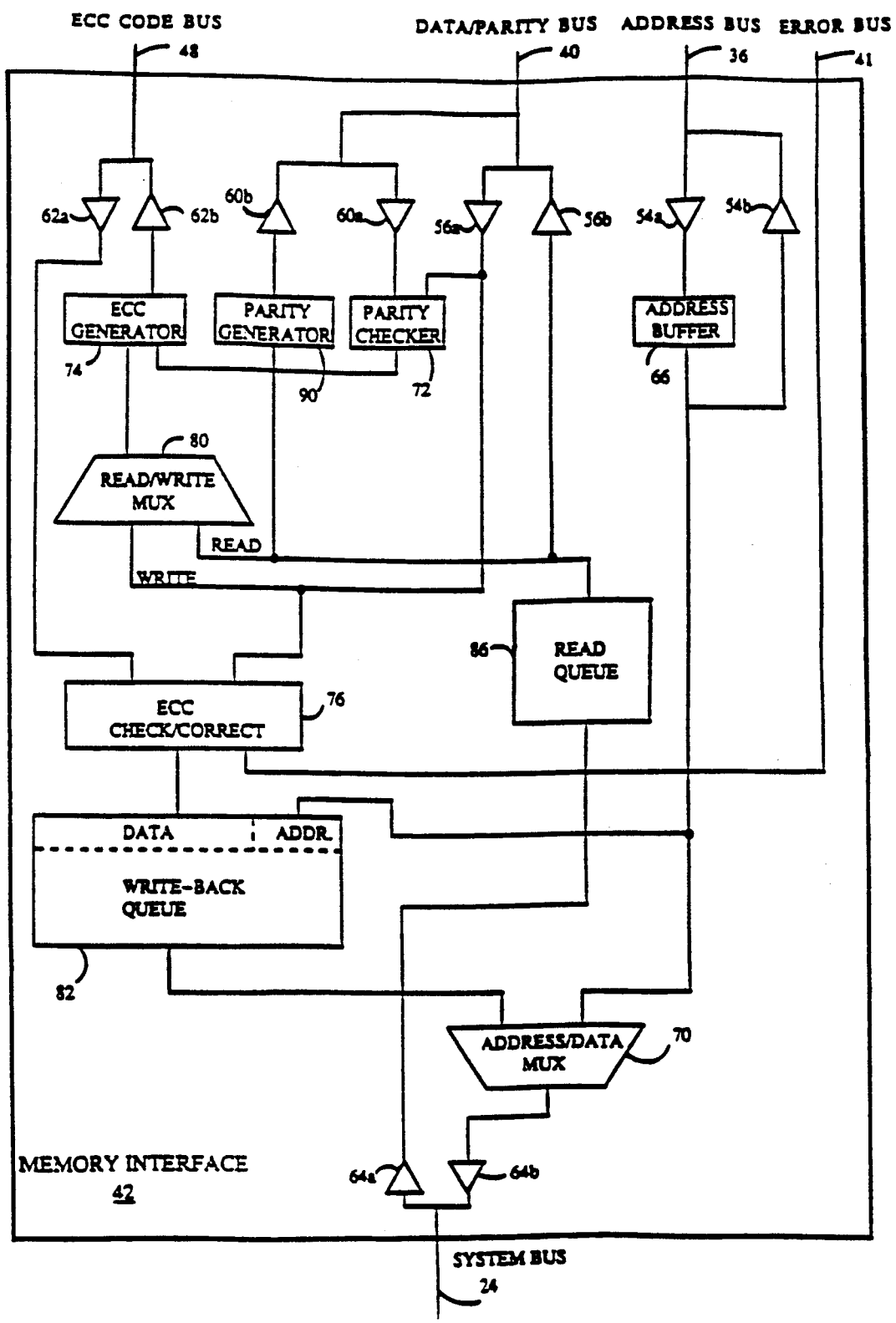

WRITE-BACK CACHE WITH ECC PROTECTION

RELATED APPLICATIONS

The present patent application is related to the following applications filed at the same time as this application:

U.S. patent application (PD91-0044), by Michael A. Callander and Douglas Elliott Sanders, entitled A TWO-LEVEL PROTOCOL FOR MULTI-COMPONENT BUS OWNERSHIP, AND IMPLEMENTATION IN A MULTI-PRO-CESSOR CACHE WRITE BACK PROTOCOL;

U.S. patent application (PD91-0045), by Douglas Elliott Sanders and Michael A. Callander, entitled METHOD AND APPARATUS FOR FILTERING INVALIDATE REQUESTS;

U.S. patent application (PD91-0046), by Michael A. Callander, Linda Chao and Douglas Elliott Sanders, entitled APPARATUS FOR SUPPRESSING AN ERROR REPORT FROM AN ADDRESS FOR WHICH AN ERROR HAS ALREADY BEEN REPORTED;

U.S. patent application (PD91-0047), by Soha Mahmoud Nadim Hossoun and Douglas Elliott Sanders, entitled AN IMPROVED PARITY GENERATOR; and U.S. patent application (PD91-0049), by Douglas Elliott Sanders, Michael A. Callander and Linda Chao, entitled METHOD AND APPARATUS FOR COMPLETING A DEFERRED READ REQUEST IN THE PRESENCE OF AN ERROR.

FIELD OF THE INVENTION

This invention relates to a cache memory and a memory interface, more particularly a write-back cache which is protected against data errors through error correction coding ("ECC") which is furnished by the memory interface.

BACKGROUND OF THE INVENTION

A computer system is typically made up of one or more central processing unit modules which are linked to a main memory module via a system bus which carries data, addresses, and control signals to and from the modules. For purposes of this document, the term "data" will refer to all information which is stored in the various memory devices of the computer, and retrieved and processed by the CPU(s), even though such information may be comprised of addresses. Stated differently, "data" will include the binary values stored in the memory devices and processed by the CPU(s), even though those stored and processed values may in fact represent an address that the CPU(s) wishes to access. On the other hand, the term "address" will refer to the binary values which are driven onto a bus for the purpose of accessing or storing data in a memory device.

Ordinarily, a CPU will retrieve data from main memory, perform some operation on it, and eventually store the results back in main memory. System performance is significantly effected by the number of times a given CPU must access main memory in order to get the data it needs to process. Particularly in a multi-processor configuration, in which a number of processors may be vying for access to the system bus, any single processor may be stalled while it waits for its turn to use the system bus and access main memory. Such stalling has a tendency to degrade system performance.

To reduce the number of times a given processor must access main memory, many systems include a relatively small memory within the CPU module, which is referred to as a "cache" and which principally holds the data which the CPU is currently processing, or likely to process in the near future. Given that the availability of data in a cache will reduce the latency associated with reading data from main memory and also reduce a given CPU's use of the system bus, system performance can be significantly improved through the use of a cache. Known in the computer architecture art are two types of caches: a "write through" cache and a "write-back" cache.

In a write through cache system, when the CPU requests data which is then not currently in the cache, the data is taken from main memory and stored in the cache. When the cache is filled, main memory transfers more than just the single data item sought by the CPU by including in the transfer other data that was in the same locality in main memory as the originally requested data. In many instances, after the CPU processes the requested data item it will want to continue processing other data items that were in the same locality in main memory and that were transferred with the requested data. If this is so, the CPU will not have to go to main memory to process the next data item, and the system performance will be correspondingly improved, as discussed above.

One drawback of a write through cache, however, is that anytime the CPU modifies a piece of data it will automatically update main memory's copy of that data. This updating function is accomplished by having the CPU write the data to main memory by using the system bus, which consequently causes system latencies. Accordingly, a write through cache improves system performance somewhat, by reducing the number of accesses the processor must make to main memory to read data for processing; however, it still has the disadvantage of requiring modified data to be written to main memory, which has a tendency to degrade system performance.

A write-back cache, on the other hand, operates similar to the write through cache in that it, too, is filled when the CPU requests data which is not then in the cache. Also, it is filled with more than just the single data item requested by the CPU, which, again, results in the probability that the next piece of data sought by the CPU will be in the cache. Unlike the write through cache, the write-back cache does not automatically update main memory each time it modifies a piece of data. Accordingly, system bus traffic is reduced which improves processing performance. For this reason, a write-back cache would be more desirable than a write through cache. There is, however, a disadvantage to the use of a write-back cache in place of a write through cache, which relates to the recovery of corrupted data and which can be understood only after a brief explanation of the function of parity and ECC protection.

Although on a statistical basis it does not happen frequently, occasionally when information is transferred or stored in a computer system it is possible for the binary values of the information to be changed due to any one of a number of reasons, including electrical interference or "noise", component failures, and the like. For example, one node may transfer a certain binary value, such as 00000000, but due to bus noise the receiving node may receive the binary value 00000001. Alternatively, a given node may store the binary value 00000000 in a random access memory ("RAM"), but due to a failure of the components which make up the RAM, that stored value may convert to 00000001. Absent any other information, in both instances it would be impossible for the system to tell that an error had occurred or to reconstruct the original binary values.

In order to protect the integrity of information within the computer system, many designs include parity information, typically a single bit called a "parity bit", which is computed on the basis of the binary value of the data that the parity bit is intended to represent. The parity bit is usually transferred and stored along with its related data. Consequently, if a parity bit is checked and it does not match the data with which it is associated, that data will be treated as corrupt data. In more sophisticated computer systems, data may also be protected through the use of ECC, which involves the generation of an ECC code, also in the form of a binary value, for the data. Unlike parity bits, which simply indicate whether the data is correct, but cannot be used to reconstruct corrupted data, an ECC code can be used to restore corrupted data to its original value, provided the magnitude of the data corruption is not too great. Therefore, when a parity error is detected, ECC protected data may be reconstructed to its original, correct value.

In many existing computer systems which use ECC, the circuitry necessary to generate and check ECC codes, as well as correct erroneous data, is implemented in main memory. Therefore, any data that was ever stored in main memory is protected by ECC, and consequently might be recontructed and corrected if a parity check detected that it was erroneous.

Referring once again to the operation of caches, the disadvantage of a write-back cache relative to a write through cache can now be seen, if it is desirable to have data protected by ECC. Specifically, in a system which uses a write-back cache, data which has been modified by the CPU is not automatically written back to main memory, resulting in the cache having the only current version of that data. More importantly, in a system in which the ECC is implemented in main memory, the modified data will not be protected by ECC because it has never been stored in main memory.

This disadvantage of a write-back cache can be more fully illustrated with an example. Assume that an ECC protected main memory fills a write-back cache with current data, the CPU reads that data out of the cache and modifies it, and then writes that modified data back into the cache along with its parity bit. Further assume that while the modified data is stored in the RAM's of the cache a single bit of the data gets corrupted. Finally, assume that the CPU now reads the modified and corrupted data, but detects the data error through a check of the parity bit. Although the original data was protected by the ECC of main memory, the modified version of the data was never returned to main memory by the write-back cache for ECC encoding. Consequently, although the CPU can detect that the data is erroneous, the system cannot reconstruct that data by referring back to the ECC coding of the original data because the data was subsequently modified.

By contrast, a system using a write through cache would not encounter this difficulty because, as discussed above, each time the CPU modifies data that is stored in the write through cache, main memory is automatically updated. At the time of updating, main memory will generate an ECC code for the modified data. As a result, if, using the same example above, the CPU were to read the modified and corrupted data from the write through cache and detect an error by checking the parity bit, it would invoke a software routine which flushes the bad data from the cache and replaces it with the correct data from main memory. The CPU can then continue its processing function using the correct data.

In summary, a write through cache has the disadvantage of automatically updating main memory each time it modifies data in the cache, which causes a degradation in system performance due to the delays associated with using the system bus to access main memory. The write through cache, however, has the advantage of having all of the data stored in it ECC protected, precisely because it does write all modified data back to main memory. On the other hand, a write-back cache has the advantage of improving system performance, relative to a write through cache, because it does not automatically update memory each time cache data is modified, resulting in fewer system bus transactions. The write-back cache, however, has the disadvantage of not insuring ECC protection of all data in the cache for the reasons discussed above, even though the data that has been in main memory may be ECC protected.

It should be noted that new system designs may provide ECC code generation and checking circuitry as well as error correction circuitry on the CPU. This arrangement enables the new systems to take advantage of a write-back cache, and its corresponding contribution to performance improvement, while also taking advantage of the protection of data integrity through ECC. All data processed by the CPU will have an ECC code, even if it has never been stored in main memory. The present invention, however, is designed to enable existing and future systems, which do not have ECC circuitry built into the CPU(s), to be modified or constructed such that the system can use CPU(s) which do not have ECC circuitry with a write-back cache, and still have ECC protection. In order for a system to be eligible for this modification, however, it is necessary for the CPU(s) of the system to have the ability to detect single bit parity errors, and, in response, invoke an error handling procedure which is typically contained in a software routine.

Accordingly, it is an object of the present invention to provide a write-back cache which can be easily and inexpensively integrated into a computer system while also achieving ECC protection of all data in the cache. A feature of the invention is that ECC codes are generated and checked and errors are corrected by a memory interface, and ECC codes are stored in the cache. An advantage, therefore, is that many existing CPU's may be able to take advantage of this invention and its beneficial effect on system performance, provided that the CPU's are capable of detecting single bit parity errors and responding by invoking a error handling routine.

Moreover, system designs which have a write through cache may easily incorporate the present invention because they already have software which includes an error handling routine. When a parity error is detected, write through caches use such a routine to flush the bad data from the cache and replace it with good data from main memory. Therefore, another advantage of the present invention is that its implementation in a system which already has a write through cache would require minimal software modification because the software error routine required by the invention is basically the same as the one already used by write through caches, except that instead of flushing the bad data, the bad data is returned to main memory via the memory interface. This similarity results in greater ease and less expense in incorporating the present invention in existing designs.

Another object of the present invention is to make a write-back cache design as robust as a write through cache design so that it is capable of supporting ECC protection of all data in the cache. In so doing, the write-back cache would no longer be less desirable than a write through cache with respect to protection against data corruption. A feature of the present invention is to have all data in cache, including data modified by the CPU, ECC encoded by the memory interface. Therefore, another advantage of the present invention is that systems that previously did not use a write-back cache, due to its incompatibility with ECC, can now do so, and thereby benefit from the effect the write-back cache has on system performance.

A further object of the present invention is to not place the responsibility for ECC coding, checking, and error correcting on the system's CPU. This is to insure that the invention is compatible with many existing CPU's, and to insure that the CPU will not have to be involved in ECC functions, other than in certain instances the CPU will detect a parity error and respond by invoking an error handling routine. By having the ECC function performed by the memory interface, a system in which the CPU can already detect parity errors and invoke a correction procedure, will not require a substitute CPU, and its related expense, in order to take advantage of the invention. Moreover, the ECC function is kept out of the performance critical path between the CPU and cache.

SUMMARY OF THE INVENTION

In accordance with the present invention, a memory interface and a write-back cache are provided for integration into computer system designs in which ECC code generation and checking and error correction circuitry are contained within the memory interface. In order to be compatible with the functions provided by the memory interface and cache, the CPU must be able to detect single bit parity errors, and invoke some error handling routine in response to the detected error.

The memory interface is coupled with a given CPU and its related write-back cache, and operates as the interface between them both and the system bus. The system bus provides a link to main memory, as well as any other nodes on the system bus. Contained within the memory interface is ECC circuitry which generates and checks error codes, and is also capable of correcting data which is in error. The cache, on the other hand, is comprised of: data RAM's, which store data and parity information; ECC RAM's, which store the ECC code for the data contained in the data RAM's; and cache control logic, which is the control circuitry which operates the cache. As a write-back cache, the cache will not automatically write data back to main memory after it is modified by the CPU.

Typically, the CPU first searches for the data that it needs to process in its cache. Assuming it does not find it there, it will request the data from main memory, which will send the requested data along with other data that was stored in the same general locality as the specifically requested data. Before the data passes to the cache for storage in the data RAM's, it will pass through the memory interface which will, at that time, generate parity information and ECC codes for all of the data bound for the cache. The data and its associated parity information will be stored in the cache's data RAM's and the ECC codes will be stored in the cache's ECC RAM's. Consequently, all data that originated in main memory will be ECC protected.

During processing the CPU may modify data contained in the cache, but not automatically update main memory. This creates an ECC coding problem given that the original ECC code generated by the memory interface will not be correct with respect to the newly modified data. In accordance with the present invention, this problem is addressed by having the CPU send the newly modified data to the memory interface at the same time that it sends it to the cache. As a result, the memory interface will generate ECC codes for the modified data which will be stored in the ECC RAM's, while the data, itself, will be stored in the data RAM's. As a result, the parity information and ECC code and the modified data in the cache will be consistent.

Supposing, for example, that some data which was modified by the CPU and stored in the cache was later corrupted by a single bit changing its value while stored in the data RAM's. When that data error is detected by the CPU discovering a parity error, the CPU will instruct the cache to send the corrupt data back to main memory. In some respects this is like a cache flush, which occurs in a write through cache system. In this instance however the cache is not simply discarded; rather, it is returned to main memory via the memory interface which will take the erroneous data and correct it using its ECC code checking and correcting circuitry. Therefore, the correct data, namely the modified value which was eventually corrupted, will be restored before it is sent to main memory. The CPU can then request the data from main memory, which will result in a cache fill and the restoration of the correct data in the cache.

It is worth noting at this point that the disadvantages of the prior art have been overcome by the present invention. Namely, the system is able to incorporate a write-back cache and take advantage of its contribution to improved performance since it requires fewer accesses to main memory. At the same time the invention insures that all data is ECC protected, even the data that has been modified by the CPU, but not automatically updated in main memory. Given that the ECC encoding, checking, and correcting is done by the memory interface, no accesses to main memory are required to implement ECC protection, except in the instance when an error is detected and the cache must be returned to main memory. This happens infrequently enough so that its effect on system performance is negligible.

Other objects, features, and advantages of the present invention will be further appreciated and better understood upon consideration of the following detailed description of the preferred embodiment, presented in conjunction with the accompanying drawings.

BRIEF DESCRIPTION OF THE DRAWINGS

FIG. 1 shows an overview of a computer system including multiple CPU modules, multiple I/O modules, and a main memory, with one of the CPU modules detailed to show the arrangement of the memory interface and cache of the present invention.

FIG. 2 shows the memory interface of the present invention in detail.

DESCRIPTION OF THE PREFERRED EMBODIMENT

A more detailed understanding of the present invention may be had from the following description of the preferred embodiment, given by way of example, to be understood in conjunction with the accompanying drawings.

Referring now to FIG. 1, an overview of the computer system which incorporates the present invention is shown in block diagram form. Shown in greatest detail is CPU module, generally designated 20, which is one of the system elements that performs a processing function. CPU module 20 is connected to main memory 22 via system bus 24. System bus 24 comprises the physical connection over which information, such as data, addresses, and control signals travel between the various modules on system bus 24. In the preferred embodiment of the invention system bus 24 is Digital Equipment Corporation's XMI bus.

Also shown connected to system bus 24 are a number of other CPU modules, generally designated 20(1-n), to signify that any number of such modules could be included in a system design, and they would be configured identically to CPU module 20. Finally, attached to system bus 24 are a number of input/output modules, generally designated 26(1-n), similarly signifying that any number of I/O devices could be included. The I/O devices are not directly related to the present invention; however, they have been included on FIG. 1 for reasons of presenting a more complete overview of the computer system.

The detail of FIG. 1 further shows CPU module 20 having a CPU 30 which performs the main arithmetic and logic functions of the system, as well as provide the control for the system. CPU 30 includes parity check/generate 32, which is capable of checking the parity information of the data that is read into CPU 30 and also generating parity information for the data that is written out of CPU 30. In the preferred embodiment of the present invention, each 8 bit data word is protected by a single parity bit. In the event that CPU 30 detects a parity error in the data that it is reading, it is capable of invoking an error handling procedure contained in a software routine, which will attempt to correct the error.

CPU 30 is connected to cache 34, which is a write-back cache, via address bus 36 and data/parity bus 40 which are the respective physical connections through which address and data/parity information flow between CPU 30 and cache 34. Cache 34 includes data RAM's 44 which is made up of banks of static RAM's and which is capable of storing a total of 576 KB (kilobytes): 512 KB store the actual data, while the remaining 64 KB store the parity bits covering the data. Cache 34 further includes ECC RAM's 46 which is similarly made up of banks of static RAM's and which is capable of storing 384 KB of ECC code covering the data stored in data RAM's 44. Finally, cache 34 includes control logic 50, which controls the cache and includes the circuitry necessary to determine whether a given data item requested by CPU 30 is located in cache 34.

In the preferred embodiment, the ECC protection of data is maintained at the same granularity as the parity protection. In other words, given that one single parity bit is used to protect an 8 bit word, there will be a corresponding ECC code, made up of six bits, for that 8 bit word. Moreover, the ECC code is capable of reconstructing data when there is a single bit parity error, meaning only one of the 8 bits in the word has been corrupted. A single bit error from which the system can recover is referred to as a "soft" error, and the correction of the data is accomplished by the invocation of a software error routine. More extensive errors from which the system cannot recover are referred to as "hard" errors.

During processing operations CPU 30 will request data from cache 34 by driving an address onto bus 36. Portions of the address will access data RAM's 44 and portions of the address will be examined by control logic 50 to determine whether the data is actually in cache 34, a cache "hit", or the data is not in cache, a cache "miss". Assuming a cache miss occurs, the address will have been simultaneously driven to main memory 22 through memory interface 42 over system bus 24. Main memory 22 will return the requested data through memory interface 42, and will fill cache 34.

In addition to the specifically requested data, main memory 22 will return other data that is in the same general locality in main memory 22 as the requested data. In the preferred embodiment, main memory 22 will transfer to cache 34 four blocks of 64 bits, the first one of those blocks containing the specifically requested data and the other three being the blocks that were contiguously stored in main memory 22. The reason for the transfer of all four blocks is that certain computer architecture design principles suggest that the next piece of data that will be sought by CPU 30 after it uses the requested data will be in the same general vicinity of the data first requested. Therefore, if the principle is generally true and the next piece of needed data is in cache 34, CPU 30 will not need to resort to main memory 22 to continue its processing function, which will result in a corresponding improvement in the system's performance.

To the extent that the data stored in main memory 22 is a common resource, it must be available to other modules on system bus 24, most notably CPU modules 20(1-n). Therefore, whenever main memory 22 transfers a block of data to a given CPU, CPU module 20 for example, it keeps track of the fact that that data block is now "owned" by CPU module 20. If any other CPU module, CPU module 20(1) for example, were to request data which is owned by CPU module 20, main memory 22 would have to deny access to the data actually contained in main memory 22 until ownership is relinquished and the data is returned by CPU module 20. This is particularly important given that cache 34 is a write-back cache, and therefore it will not update main memory 22 each time CPU 30 reads data from cache 34, modifies that data, and then writes the modified data back into cache 34. To this extent, the data contained in cache 34 may be different from the data contained in main memory 22. If CPU module 20(1) were to get the data contained in main memory 22, but which is owned by and has been modified by CPU module 20, CPU module 20(1) would be using stale, incorrect data.

Therefore, referring back to the above example, whenever one module requests the use of data which is owned by another module, main memory 22 will request the return of the owned data in its current and correct state from the data owner. Main memory 22 is thereby updated so that it contains correct data. It is important to note, however, that during the time period that CPU module 20 is the owner of a given block of data, if the data has been modified, cache 34 will contain the only correct copy of the data until the updating occurs.

Referring still to FIG. 1, CPU 30 is connected to memory interface 42 through address bus 35 and data/parity bus 40 which form the respective, physical interconnection through which address and data/parity information flows between CPU 30 and memory interface 42. Information which is to be received from or sent to main memory 22 from CPU 30 or cache 34 will pass through memory interface 42. Memory interface 42 contains ECC circuitry 52, which collectively is a means for generating and checking ECC codes for data stored in cache 34, and also correcting corrupted data, as shall be detailed below in connection with the discussion of FIG. 2. Memory interface 42 is also connected to CPU 30 through error bus 41, the purpose of which will also be explained below in connection with the discussion of FIG. 2.

Memory interface 42 is also connected to cache 34 through address bus 36, data/parity bus 40, and ECC code bus 48. Buses 36, 40, 48 form the respective, physical interconnection through which addresses, data/parity, and ECC codes flow between cache 34 and memory interface 42.

Referring now to FIG. 2, memory interface 42, shown in enhanced detail, includes bi-directional buffers 54a-54b, 56a-56b, 60a-60b, 62a-62b, 64a-64b. Buffer 54a is coupled with address bus 36 and carries address information. Its output is coupled to address buffer 66, which comprises one of the two inputs to address/data multiplexer 70.

Buffer 56a is coupled with the data lines of data/parity bus 40 and carries data. Buffer 56a comprises one of the two inputs to parity checker 72. Buffer 60a is coupled with the parity lines of data/parity bus 40 and carries parity information, and it comprises the second of the two inputs into parity checker 72. The output of parity checker 72 comprises one of the two inputs of ECC generator 74. The output of buffer 56a also comprises one of the two inputs for ECC check/correct 76 and one of the two inputs for read/write multiplexer 80. The output of read/write multiplexer 80 comprises the second of the two inputs of ECC generator 74, the first such input coming from parity checker 72.

Buffer 62a is coupled with ECC code bus 48 and carries ECC codes. Its output comprises the second of two inputs into ECC check/correct 76, the first such input coming from buffer 56a. One of the two outputs of ECC check/correct 76 comprises error information, indicating whether a detected ECC error is hard or soft, which is coupled back to CPU 30 over error bus 41. The second of the two outputs of ECC check/correct 76 is data and it comprises one of two inputs into write-back queue 84, the second of the two inputs of write-back queue 84 being comprised of address information from address buffer 66.

The output of write-back queue 82 comprises the second of two inputs for address/data multiplexer 70, the first such input coming from address buffer 66. Address/data multiplexer 70 is responsive to control lines (not shown) which determine which of its inputs will be output to buffer 64b, which is coupled with system bus 24.

Buffer 64a is coupled with system bus 24 and carries data. It forms the input to read queue 86, while the output of read queue 86 provides input to buffer 56b, parity generator 90, and read/write multiplexer 80. The output of buffer 56b goes to the data lines of data/parity bus 40. The output of parity generator 90 goes to buffer 60b, which outputs to the parity lines of data/parity bus 40. Read/write multiplexer 80 is responsive to control lines (not shown) which determine whether it will output the input which it receives from read queue 86 or buffer 56a.

The output of read-write multiplexer 80 is the second of two inputs into ECC generator 74, the first such input coming from parity checker 72, and the output of ECC generator 74 is the input for buffer 62b. Buffer 62b outputs ECC codes over ECC code bus 48.

During operation, memory interface 42 performs as follows: CPU 30 will first seek data which it needs to process in cache 34 by driving an address onto address bus 36, as described above. Assuming that the data sought was not in cache 34, resulting in a cache miss, CPU 30 will request the data from main memory 22 by also driving the address of the data to memory interface 42. That address enters buffer 54a and is forwarded to address buffer 66 and then to address/data multiplexer 70, which is responsive to control lines (not shown) which will have address/data multiplexer 70 output the address to buffer 64b. Buffer 64b will forward the address on system bus 24 to main memory 42. The data will be sent from main memory 22 to CPU 30 through memory interface 42.

The requested data will enter memory interface 42 through buffer 64a. To the extent that main memory 22 will have sent four blocks of data, as discussed above, those four blocks will be stored in read queue 86, with the block containing the specifically requested data at the top of read queue 86.

The requested data will be immediately forwarded to CPU 30 via buffer 56b and bus 40, so that CPU 30 will not have to wait to perform its processing function. The data will also be sent to cache 34 over data/parity bus 40. In addition, the data will be channeled through parity generator 90 and ECC generator 74.

Parity generator 90 will generate a single parity bit for each one of the 8 bytes of data in any given block. ECC generator 74, on the other hand, will generate one ECC code, made up of 6 bits, for each one of the 8 bytes forming the block. The output of parity generator 90 is clocked together with its corresponding data over data/parity bus 40, and will be stored in data RAM's 44 (shown on FIG. 1). The output of ECC generator 74 will be output over ECC code bus 48, and will be stored in ECC RAM's 46 (shown on FIG. 1). Thus, all of the data originating from main memory 22 and sent to CPU 30 will be ECC and parity protected by memory interface 42 before it is stored in cache 34.

When data stored in cache 34 is used by CPU 30, parity check/generator 32 will check the parity bits to determine whether the data CPU 30 is about to process is correct, or has been corrupted during storage or transmission. Supposing, for example, that after ECC encoding by memory interface 42, one of the bits of a word of data stored in data RAM's 44 has changed during storage, simply due to a circuit element failure in the RAM. When CPU 30 reads that word and checks the parity bit it will detect that the data is corrupt. Having detected the corrupt data, CPU 30 will next invoke an error handling routine contained in software. This software routine will result in having the bad data in cache 34 transferred back to main memory 22 via memory interface 42. In this particular example, the system would be able to recover the data because the error was a soft error, only involving the corruption of one single bit of the data word. Other types and more extensive data corruption may result in non-recoverable, hard errors, which will be discussed below. Also, whenever such an error is detected and corrected, ECC check/correct 76 will so notify CPU 30 over error bus 41.

It is important to note that this error handling approach is quite similar to the error correction procedure that is typically used with a write through cache when a parity error is detected. Namely, the contents of the cache are simply flushed and main memory refills the cache with the correct data. This type of error correction approach will not work with a typical write-back cache because the cache may contain the only correct version of the data, assuming the data originating from main memory had been subsequently modified by the CPU. Flushing the cache would thereby eliminate unique data. Notwithstanding this, systems which already use write through caches can incorporate the present invention with minimal modification to their software because they already contain an error recovery approach which is similar to the one required by the present invention. With respect to the software modification, the code would simply have to be amended so that the contents of the cache are returned to main memory through the memory interface, rather than a complete flushing. Thereafter, the existing code which refills the cache from main memory can be preserved.

Referring back to the present invention and the above example, when cache 34 transfers the bad data back to main memory 22 the data will be transferred from data RAM's 44 over data/parity bus 40 and it will enter buffer 56a for transfer to ECC check/correct 76. Simultaneously, ECC RAM's will transfer the corresponding ECC code for the data over ECC code bus 48 and it will enter buffer 62a and be transferred to ECC check/correct 76. ECC check/correct 76 will match the data and its corresponding ECC code, and correct any data that is incorrect according to its ECC code.

Given that some of the data is corrupt, namely the incorrect data word which was detected by CPU 30 through its parity check, ECC check/correct 76 will detect the incorrect data and then it will correct that data so that it is restored to its original value. Thereafter, ECC check/correct 76 will transfer the corrected data to write-back queue 82. In addition to the corrected data from ECC check correct 76, write-back queue 82 will also receive address information coming from address buffer 66. The data and its appropriate address is output by write-back queue 82 to address-/data multiplexer 70, which is responsive to control lines (not shown) which determine which of its two inputs is forwarded to buffer 64b. In this example, the contents of write-back queue 82 would be transferred, and thereby sent to main memory 22 over system bus 24. Main memory 22 will then contain the correct data.

Then, CPU 30 will once again request the data that it was attempting to process when it detected the parity error. This will result in main memory 22 filling cache 34 with the requested data. That data will follow the same route back to CPU 30 and to cache 34, as discussed above, including parity and ECC encoding. Therefore, although the data was corrupted due to a failure of the RAM's in cache 34, the present invention will enable the system to recover from that data error.

It should be noted that the return of data from cache 34 to main memory 22 may be the result of a number of conditions, not just the detection of a parity error by CPU 30 during its processing operations. For example, data may be returned to main memory 22 from cache 34 as a result of the need of CPU 30 to bring other data from main memory 22 into cache 34. Given that there is a limited amount of storage space in cache 34, unneeded data may have to be returned to free up a storage location for the needed data. Alternatively, even though CPU 30 may not need to return the data to make room for new data, another module in the computer system, CPU module 20(1), for example, may request the data in cache 34. Being a common system resource, the data would have to be returned to main memory 22 by CPU module 20 so that CPU module 20(1) would be able to use that data.

In any case, data returned to main memory 22 would follow the same route from cache 34, through memory interface 42, and back to main memory 22, as described above in connection with the return of data as a result of a parity error detection by CPU 30. Therefore, if data were corrupted while stored in data RAM's 44, that data will be corrected as it goes through memory interface 42, even though the return of the data was not prompted by a detection of an error by CPU 30.

Still focusing on the function of memory interface 42, suppose an example similar to the one discussed above, in which cache 34 has been filled with data from main memory 22. During its processing of the data, CPU 30 reads data out of data RAM's 44 of cache 34, modifies that data, and then writes it back into cache 34. When it does so, parity check/generator 32 of CPU 30 will generate corresponding parity information to protect the modified data values.

Moreover, given that the data has been modified, its original ECC code—generated when the word originally came from main memory 22 via memory interface 42—will no longer be correct. Given that cache 34 is a write-back cache it will not automatically update main memory 22 and pass the data through memory interface 42. The updating of main memory 22 may be delayed for some time until CPU 30 wishes to return some or all of the contents of cache 34 to main memory, so that other data can be written into cache 34, or CPU 30 returns the contents of cache 34 to main memory 22 because some other module has requested that data resource, as discussed above.

Therefore, according to the present invention, in order to preserve the ECC protection of even that data which has never been stored in main memory 22, at the time that CPU 30 writes the modified data back into cache 34, it will simultaneously transfer that data to memory interface 42 along data/parity bus 40. That data will enter buffer 56a and be routed into read/write multiplexer 80. Read/write multiplexer 80 is responsive to control lines (not shown) which signal that data is being written by CPU 30 into cache 34, instead of signaling that data is being read out of main memory 22 via read queue 86. As a result of the read/write control signals, read/write multiplexer 80 will transfer the appropriate data. In this example, it would forward to ECC generator 74 the data coming from CPU 30, and that data would be ECC encoded. Furthermore, the data will be stored in data RAM's 44 and the ECC codes will be stored in ECC RAM's 46 (shown in FIG. 1) in the same fashion as described above in connection with data that originated from main memory 22. For this reason, FIG. 2 shows the output of read queue 86 as a "READ" input for read/write multiplexer 80, while the output of buffer 56a from data/parity bus 40 as a "WRITE" input for read/write multiplexer 80. After such ECC encoding and the storage of the ECC codes, the modified data, which is unique and only stored in cache 34, will be ECC protected.

Importantly, control signals (not shown) similar to those that operate read/write multiplexer 80 also operate ECC check/correct 76. Therefore, even though data may be presented to ECC check/correct 76 by buffer 56a, at the same time that that data is presented to read/write multiplexer 80, ECC check/correct 76 will not process that data as a result of its control commands.

Still referring to the example of the operation of CPU 30 when it modifies data which is stored in cache 34, CPU 30 will compute the parity value for the modified data in parity check/generator 32. Therefore, it is not necessary for memory interface 42 to also generate parity for the data, as was done when data came from main memory 22 through read queue 86. On the other hand, when CPU 30 sends modified data to memory interface 42 for ECC encoding, as described above, it will send the data along with the parity generated by parity check/generator 32 (shown on FIG. 1), and the data sent by CPU 30 will be checked against its related parity bits by parity checker 72 of memory interface 42.

Supposing, for example, that when CPU 30 modified data and sent it to memory interface 42, one of the bits of a given data word was corrupted en route, due to stray interference or noise on data/parity bus 40. The parity bits will enter memory interface 42 through buffer 60a and then they are forwarded to parity checker 72. Simultaneously, the data will enter memory interface 42 through buffer 56a and will similarly be forwarded to parity checker 72. Given that in this example one of the bits of the word has been corrupted, parity checker 72 will detect that the parity value generated by parity check/generator 32 does not coincide with the data value. As a result, parity checker 72 will signal ECC generator 74, through the output of parity checker 72, to generate a faulty ECC code for that data, indicating that the data is corrupt and cannot be recovered.

This faulty ECC code will be stored in ECC RAM's 46 while its related, corrupt data will be stored in data RAM's 44, the same as if the data was correct. Eventually, when the corrupt data and its faulty ECC code are returned to main memory 22, for any one of the number of reasons discussed above, it will be channeled through memory interface 42. In particular, it will go through ECC check/correct 76. At that point, ECC check/correct 76 will detect the faulty ECC code and the corrupt data. Unlike the soft error, discussed above, this type of data corruption is not one from which the system can recover and ECC check/correct 76 will so notify CPU 30 over error bus 41.

Referring back to the same example discussed above, supposing data modified by CPU 30 had no parity problems and was ECC encoded by memory interface 42, and its ECC codes were stored in ECC RAM's 46 and the corresponding data and parity were stored in data RAM's 44. Again suppose that due to a component failure within data RAM's 44, one of the 8 bits of a given data word is corrupted. When CPU 30 reads that corrupt data out of cache 34, it will detect the parity error through parity check/generator 32. Now, however, because the modified data has an ECC code for its newly modified value, CPU 30 is able to return the bad data of cache 34 to main memory 22 in the same fashion as discussed above, and that data will be restored to its correct, but modified value. CPU 30 would again call the software routine that returns the contents of cache 34 to main memory 22 via memory interface 42. The corrupt data would be corrected by ECC check/correct 76 and restored to its correct value, and ultimately returned to main memory 22. Thereafter, the data will be returned to cache 34 in the same fashion as data originating out of main memory 22, and CPU 30 will be able to continue its processing function with correct data.

Importantly, the ECC functions of generating and checking ECC codes and their corresponding data, as well as correcting errors through the use of ECC codes, are carried out by memory interface 42. The only support function provided by CPU 30 is that under certain circumstances CPU 30 may have detected a parity error, and, in response, invoked a software error handling routine, which involves the returning of the bad data to main memory 22 through memory interface 42. In other circumstances, the return of bad data may result from the return of that data to main memory 22 to make room for other data needed by CPU 30, or result from the return of that data because it was requested by another module on system bus 24, such as another CPU module. In any case, the ECC function is kept out of the critical data path between CPU 30 and cache 34, which means that many computer systems may be able to incorporate this invention without having to change CPU's.

Accordingly, the invention in its broader aspects is therefore not limited to the specific details, representative apparatus, and illustrative examples shown and described. Thus, departures may be made from such details without departing from the spirit or scope of the invention. details without departing from the spirit or scope of the invention.

What is claimed is:

1. A device for interfacing a central processing unit ("CPU") and a cache to a system bus, the CPU having the ability to generate parity information which corresponds to data modified by the CPU, said device comprising:

a first bus for transferring data and parity information corresponding to the data, said first bus being connectable to the cache and the CPU;

a second bus for transferring Error Correction Codes ("ECC") corresponding to the data, said second bus being connectable to the cache;

a third bus for transferring data, said third bus being connectable to the system bus;

an ECC generator/checker/corrector means for generating and checking the ECC corresponding to the data, and for correcting corrupt data by reference to the data and its corresponding ECC;

a parity generator, said parity generator being capable of generating a parity code corresponding to the data transferred to said device over the system bus for storage in the cache;

a parity checker, said parity checker being capable of checking and detecting parity errors in the data transferred to the device from the CPU by reference to the data and its corresponding parity code when modified data is transferred to the device by the CPU for ECC encoding;

first and second bi-directional buffers;

a read queue;

a read/write multiplexor; and said first bi-directional buffer being coupled to said third bus and said read queue; said read queue being coupled to said read/write multiplexor; said read/write multiplexor being coupled to said ECC generator means; said ECC generator means being coupled to said second bi-directional buffer; said second bi-directional buffer being coupled to said first and second buses; and said ECC checker/corrector means, said parity generator, and said parity checker being coupled between said first and second bi-directional buffers.

2. A device as in claim 1 further comprising a write-back queue and an address/data multiplexor; said second bi-directional buffer being coupled to said ECC check/correct means; said ECC check/correct means being coupled to said write-back queue; said write-back queue being coupled to said address/data multiplexor; and said address data multiplexor being coupled to said first bi-directional buffer.

3. An apparatus adapted for connection between a central processing unit ("CPU") and a system bus, the CPU having the ability to generate parity information which corresponds to data modified by the CPU, said apparatus comprising:

a memory means for storing data and Error Correction Codes ("ECC") corresponding to the the data;

a first bus for transferring data and parity information corresponding to the data, said first bus being coupled with said memory means and connectable with the CPU;

a second bus for transferring the ECC corresponding to the data, said second bus being coupled to said memory means;

a third bus for transferring data, said third bus being connectable to the system bus;

a means for interfacing the CPU to the system bus comprising:

an ECC generator/checker/corrector means for generating and checking the ECC corresponding to the data, and for correcting corrupt data by reference to the data and its corresponding ECC;

a parity generator, said parity generator being capable of generating a parity code corresponding to the data transferred to said interfacing means over the system bus for storage in said memory means;

a parity checker, said parity checker being capable of checking and detecting parity errors in the data transferred to said interfacing means from the CPU by reference to the data and its corresponding parity code when the data is transferred to said interfacing means by the CPU for ECC encoding;

first and second bi-directional buffers;

a read queue;

a read/write multiplexor; and said first bi-directional buffer being coupled to said third bus and said read queue; said read queue being coupled to said read/write multiplexor; said read/write multiplexor being coupled to said ECC generator means; said ECC generator means being coupled to said second bidirectional buffer; and said second bi-directional buffer being coupled to said first and second buses.

4. An apparatus as in claim 3, wherein said memory means comprises a write-back cache.

5. An apparatus as in claim 3 further comprising a write-back queue and an address/data multiplexor; said second bi-directional buffer being coupled to said ECC check/correct means; said ECC check/correct means being coupled to said write-back queue; said write-back queue being coupled to said address/data multiplexor; and said address/data multiplexor being coupled to said first bi-directional buffer.

6. A module which is connectable to a system bus, the system bus being coupled to a main memory and being capable of transferring addresses and data between said module and the main memory, said module comprising:

an interface bus, connectable to the system bus;

an address bus;

a data/parity bus;

an Error Correction Code ("ECC") bus;

a central processing unit ("CPU"), having a means for checking parity errors in and generating parity information for data processed by said CPU, and said CPU being capable of invoking an error handling routine in response to detected parity errors;

a write-back cache for storing information, said cache being coupled to said CPU through said address bus and said data/parity bus; and means for interfacing said CPU and said cache to the system bus, said interfacing means: being coupled to said CPU through said data/parity bus and said address bus; being coupled to said cache through said data/parity bus, said address bus, and said ECC bus; and being coupled to said interface bus; said interfacing means comprising:

an ECC generator which is capable of generating an ECC for data transferred to the interfacing means by the CPU or over the system bus;

an ECC checker which is capable of checking an ECC together with its corresponding data, and thereby detect corrupt data, when the data and its corresponding ECC are transferred to said interfacing means;

an ECC corrector which is capable of correcting corrupt data by reference to the data and its corresponding ECC when the data and its corresponding ECC are transferred to said interfacing means;

a parity generator which is capable of generating a parity code corresponding to the data such that when the data is transferred to said interfacing means the data is parity encoded and the data and its corresponding parity code are subsequently stored in said cache;

a parity check which is capable of checking and detecting a parity error in the data by reference to the data and its corresponding parity code when the data is transferred to said interfacing means by the CPU for ECC encoding first and second bi-directional buffers;

a read queue;

a read/write multiplexor; and said first bi-directional buffer being coupled to said interface bus and said read queue; said read queue being coupled to said read/write multiplexor; said read/write multiplexor being coupled to said ECC generator means; said ECC generator means being coupled to said second bi-directional buffer; and said second bi-directional buffer being coupled to said data/parity bus and said ECC bus.

7. A module as in claim 6 further comprising a write-back queue and an address/data multiplexor; said second bi-directional buffer being coupled to said ECC check/correct means; said ECC check/correct means being coupled to said write-back queue; said write-back queue being coupled to said address/data multiplexor; and said address/data multiplexor being coupled to said first bi-directional buffer.

* * * * *